Dec. 31, 1957 — L. E. SEVISON — 2,818,484
BOX WELDING APPARATUS
Original Filed Jan. 10, 1952 — 4 Sheets-Sheet 1
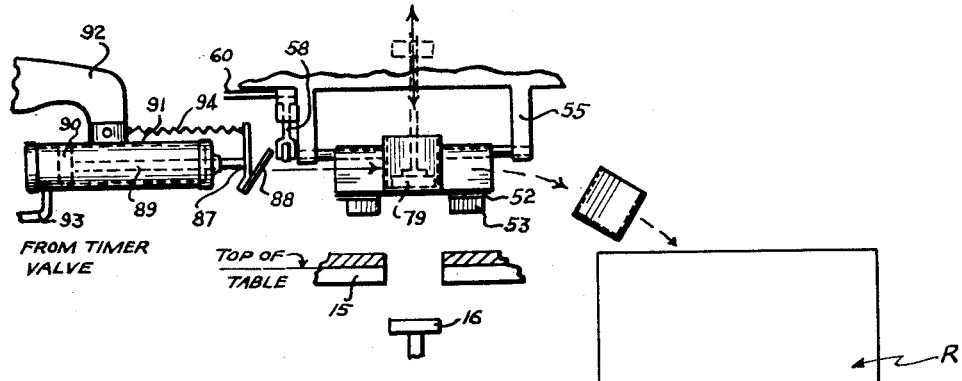
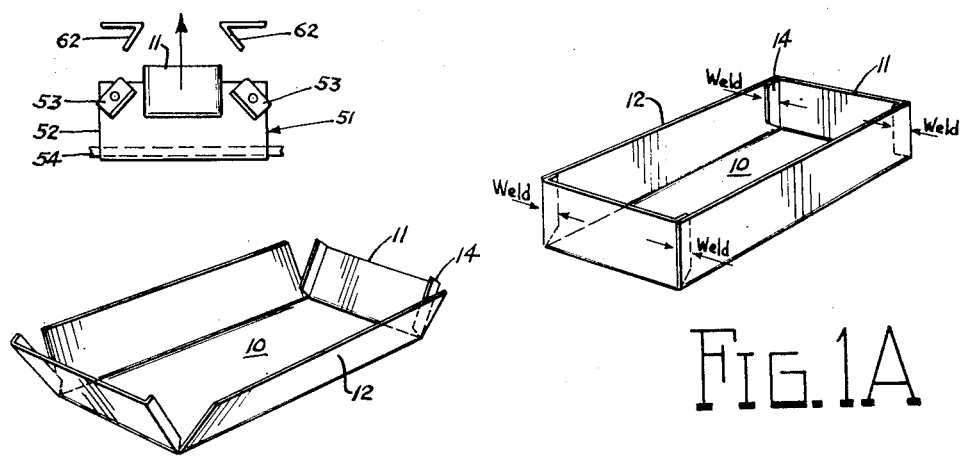
INVENTOR.
LUTHER E. SEVISON
BY
ATTORNEYS

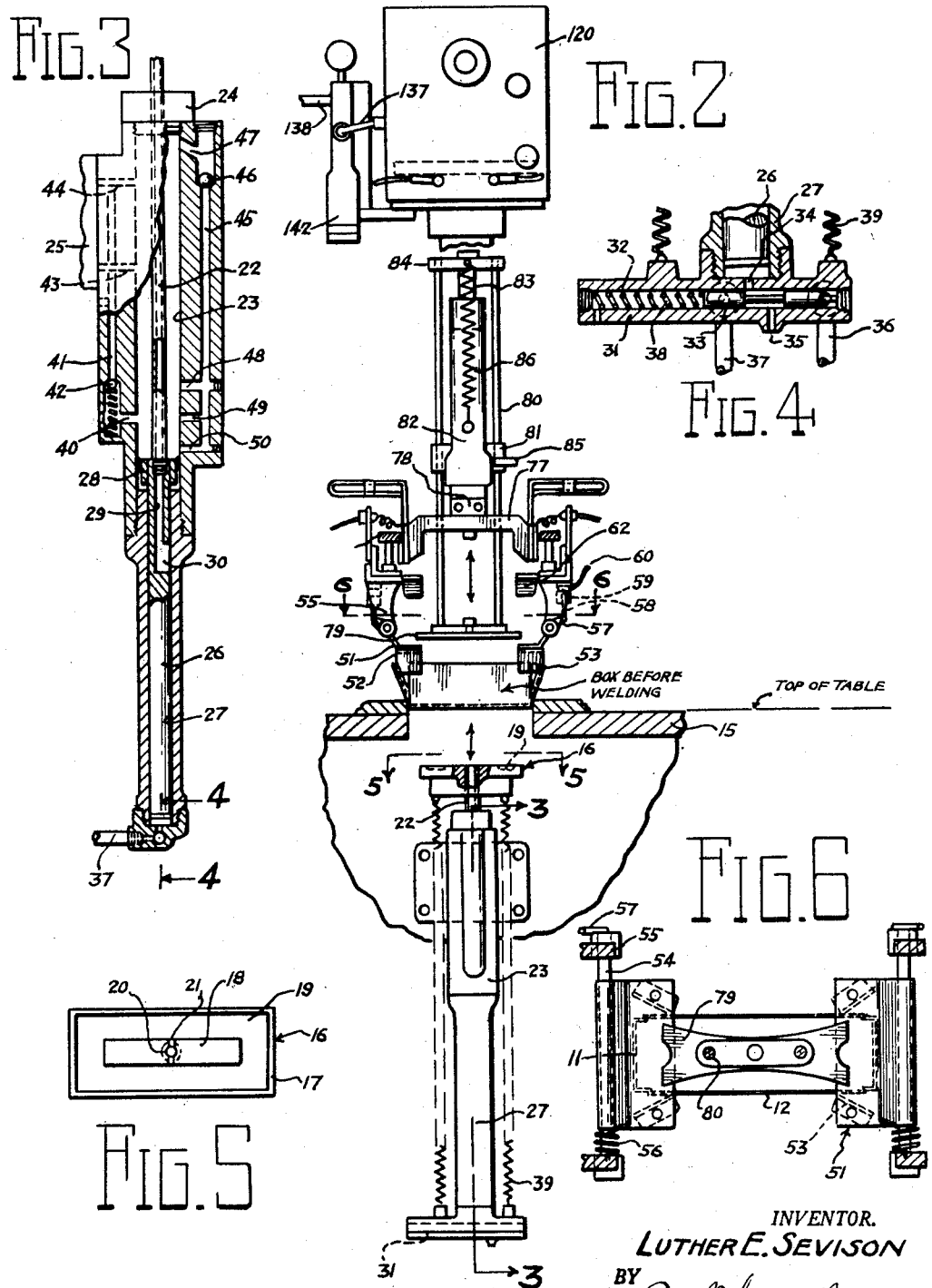

Dec. 31, 1957 L. E. SEVISON 2,818,484
BOX WELDING APPARATUS
Original Filed Jan. 10, 1952 4 Sheets-Sheet 3
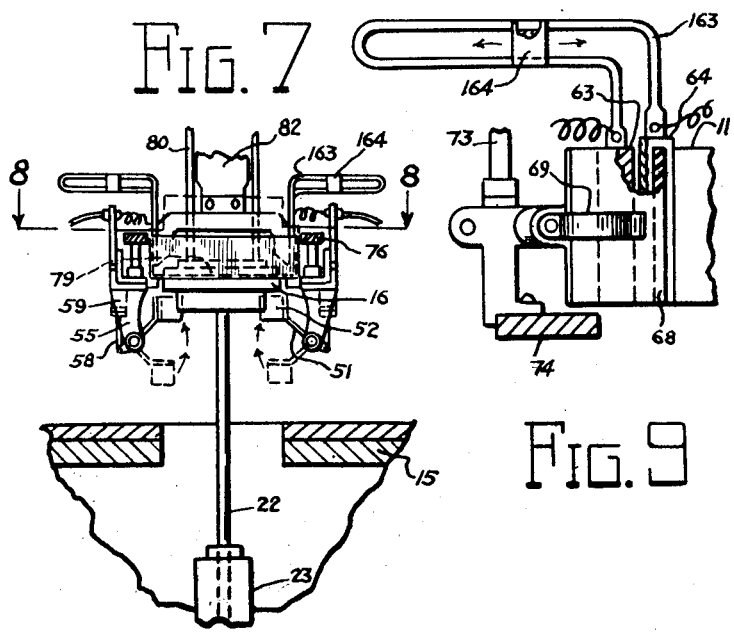
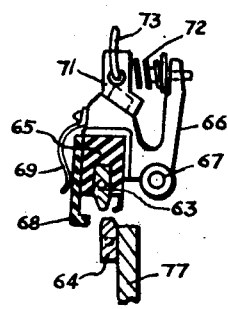
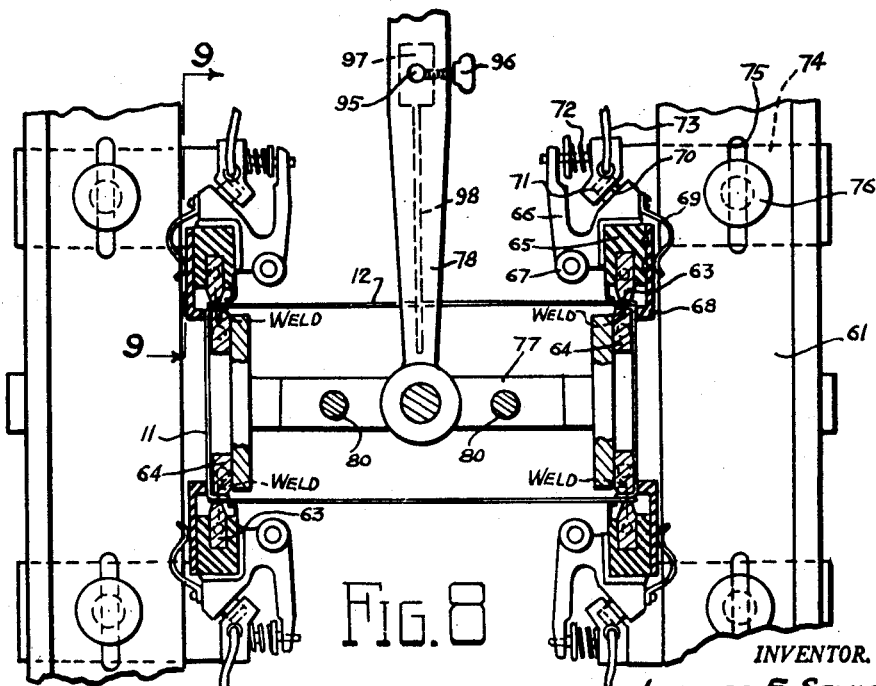
INVENTOR.
LUTHER E. SEVISON
BY
Paul, Moore & Rugger
ATTORNEYS

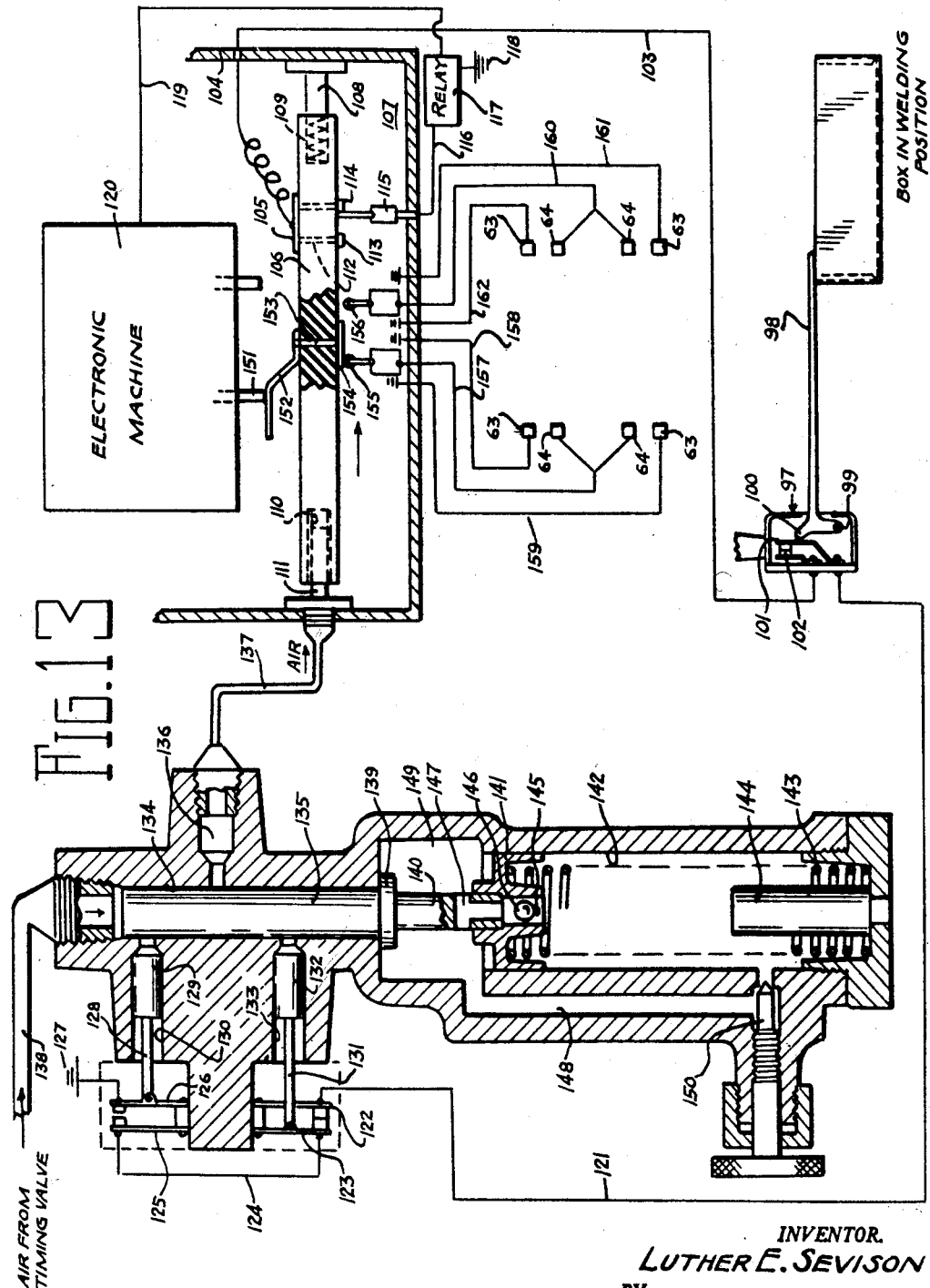

United States Patent Office 2,818,484
Patented Dec. 31, 1957

2,818,484

BOX WELDING APPARATUS

Luther Earl Sevison, Toledo, Ohio, assignor to E. G. Staude Manufacturing Company, Inc., St. Paul, Minn., a corporation of New Hampshire Original application January 10, 1952, Serial No. 265,734. Divided and this application July 25, 1955, Serial No. 524,199

8 Claims. (Cl. 219—10.53)

This invention relates to box making machinery, but particularly to machines for making boxes from thermoplastic sheet material. This application is a division of my copending application Serial No. 265,734, filed January 10, 1952.

One object of this invention is to provide a machine for making boxes of thermoplastic material in which the contiguous walls of the box are homogeneously united.

The principal object of this invention is to produce novel welding mechanism for welding the contiguous walls of the plastic box in such manner that first one end is welded and then the opposite end is welded, provision being made to insure that the welds at one end are identical to those at the opposite end.

Other objects and advantages of the invention will hereinafter appear, and for purposes of illustration but not of limitation, an embodiment of the invention is shown on the accompanying drawings, in which Figure 1 is a perspective view of a box blank having tabs bent inwardly from the end walls and the end walls folded inside of the side walls;

Figure 1A is a perspective view of the finished box after the tabs have been welded to the adjacent side walls;

Figure 2 is a side elevation of the welding mechanism and associated parts;

Figure 3 is an enlarged vertical sectional view substantially on the line 3—3 of Figure 2;

Figure 4 is an enlarged sectional view on the line 4—4 of Figure 3;

Figure 5 is a top plan view of the lifting pad and is taken on the line 5—5 of Figure 2;

Figure 6 is a transverse sectional view on the line 6—6 of Figure 2;

Figure 7 is a fragmentary view partly in section showing the pan in position to deliver a box to the welding mechanism;

Figure 8 is an enlarged transverse sectional view substantially on the line 8—8 of Figure 7;

Figure 9 is a fragmentary elevational view substantially on the line 9—9 of Figure 8, showing the tuner mounted in position;

Figure 10 is a fragmentary sectional view showing particularly a movable electrode in its inoperative position;

Figure 11 is an elevation showing one of the pans in raised position and illustrating the oppositely inclined cam plates and the stationary guide arranged above the pan;

Figure 12 is a fragmentary side elevational view showing the kick-out mechanism for ejecting the completed box from the machine and Figure 13 shows the wiring diagram for the welding apparatus and also a longitudinal sectional view of the control device which not only is effective in rendering the primary circuit complete, but also for controlling the periods of welding for the opposite ends of the box.

The overall embodiment of the invention comprises a machine for making boxes from plastic sheet material, such as cellulose acetate, flexible Vinylite, and other similar thermoplastic materials. These materials are particularly desirable not only because of their transparency, but also because they can be folded to the desired shape by the application of heat; also because they lend themselves to welding, which is employed to close and seal the corners of the box.

From the general aspect, the plastic sheet material in this instance, is in roll form and the strip from the roll is first fed to a decurler, which straightens out the sheet so that when it is delivered to the machine for blanking operation, it is flat and can be properly and satisfactorily handled. From the decurler a continuous strip of plastic sheet material is fed in a step-by-step manner to a mechanism which performs the blanking operation. The blanks are successively fed or delivered to a table which has a step-by-step rotary motion. On the table is a series of jigs which are rigid with the table and move with it. It may be said that a blank passes through five stages and these stages may be briefly described as follows:

In the first stage the blank is delivered to a jig. In the second stage, after the table has indexed to a predetermined extent, four tabs are bent or folded upwardly from the blank. In the third stage, the side walls are folded upwardly, relative to the bottom wall of the blank, the tabs being arranged on the inside between the side and end walls of the box. In the fourth stage and after a further indexing movement of the table, the bottom wall of the box is embossed in a desired or predetermined manner. In the final or fifth stage, and after a further indexing movement of the table, the tabs are welded, the box thus being finally formed and closed and then ejected from the machine.

This invention relates to apparatus comprising and performing the functions of the fifth stage of operation in the box making procedure described. For details of construction of the other elements of the box making machine performing the preceding stages of operation reference is made to the copending application Serial No. 265,734 of which this application is a division.

Referring now to the drawings, there is shown in Figure 1 a folded box blank as it is received from the previous stages. The box blank comprises a bottom wall 10, oppositely disposed end walls 11 and a pair of oppositely disposed side walls 12. Tabs 14 are folded inwardly from the opposite end edges of end walls 11. The end walls are folded toward each other to a position at about 90° to the bottom wall 10 of the box. The side walls are folded upwardly so that the tabs 14 lie inside of the side walls. It is in this general form that the box blank is received by the apparatus of this invention. The finished box, after welding, is shown in Figure 1A.

Referring now to Figure 2, after the box has been folded to the form described above and illustrated in Figure 1, it is carried by a turntable 15 common to all of the stages, provided with indexing means, and delivered to the fifth stage. In this stage the welding operation occurs, that is, the tabs 14 at the four corners of the box are welded to complete the box structure. When the box reaches this stage the bottom of the box is first engaged by a vertically movable pad 16 which moves upwardly from beneath the turntable 15 and raises the box to the desired welding position. In this instance, the pad 16 is rectangular in shape (Figure 5) and is formed with an upstanding rim 17 and a raised central portion 18 which is flush with the rim 17, an intermediate channel or grooved portion 19 being disposed between the rim 17 and the raised portion 18. There is a hole 20 disposed centrally of the pad and extends through the raised portion 18. Extending through the raised portion 18 and providing a communication between the channel 19 and the opening 20 are grooves 21. As will hereinafter appear, suction is created in the channel 19 to retain the folded box in position on the pad during its upward movement. Extending into the hole 20 of the pad 16 is an elongated relatively small diameter tube 22 which depends therefrom into a cylinder 23, the upper end of which is closed by a cap 24 (Figure 3) through which the tube 22 is slidable. Suitably secured to the cylinder 23 and extending laterally therefrom is a supporting arm 25 which is secured in any suitable manner to a rigid portion of the machine beneath the turntable 15.

The lower end of the tube 22 is fixed to the upper end of an elongated piston-like cylindrical rod 26 which is reciprocable vertically within a reduced cylinder extension 27. Secured to the upper end of the piston-like rod 26 is a piston 28 which is movable within the cylinder 23. In the upper end portion of the piston-like rod 26 is a longitudinal passage 29 which communicates with the bore of the tube 22 and at the lower end of this passage is a relatively wide lateral port 30 which opens to the outside of the rod 26.

Providing a closure for the lower end of the reduced cylinder extension 27 is a transversely disposed valve housing 31 (Figure 4) through which extends a cylindrical passage 32. Slidable within the passage 32 is a spool valve 33 having a pair of spool portions connected by a stem.

Leading from the valve passage 32 is a port 34 to the reduced cylinder extension 27 and spaced to the right of the port 34 and on the opposite side of the valve passage 32 is an exhaust port 35 (Figure 4). As shown in that figure, at the right of the exhaust port 35 is a tube 36 for admitting air under pressure from a timer valve mechanism for actuating the spool valve 33 to the left of the figure. Communicating with the passage 32 and disposed to the left of the port 34 is a tube 37 which leads from a pressure tank for delivering air under pressure to the reduced extension 27 for actuating the piston-like rod 26. Engaging the left-hand end of the spool valve 33 is a coil spring 38 for normally holding the valve 33 to the right of the figure and in such position as to open the reduced cylinder extension 27 to exhaust through the ports 34 and 35 as will be readily apparent. In operation, it will be understood that air under pressure from the timer valve passes to the valve housing through the tube 36 and shifts the valve 33 to the left of the figure, compressing the coil spring 38 and uncovering the passage from the tube 37 to the reduced cylinder extension 27 through the port 34 thereby forcing the piston-like rod 26 upwardly.

As the piston-like rod 26 moves upwardly, a partial vacuum is created between the underside of the piston 28 and the upper end of the cylinder extension 27 and when the port 30 is uncovered by its movement past the upper end of the cylinder 27, subatmospheric pressure or suction is created in the passage 29 and consequently in the elongated tube 22. Since the upper end of the tube 22 communicates by grooves 21 with the channel 19 in the box-engaging pad 16, it will be readily understood that the box blank will be retained by suction in engagement with the pad 16 during the latter's upward movement to the welding mechanism. Such suction is created in the tube 22 and consequently the pad 16 just at the time the latter has moved into engagement with the folded box blank.

Means is provided for militating against the piston 28 creating such a vacuum on its under side during its upward movement as to interfere with free upward movement of the parts. It is important to maintain sufficient suction on the box carried by the pad 16 to retain it in the desired position, but unless some means is provided to relieve to a certain extent the vacuum created by the upward movement of the piston 28, it will be apparent that there would be very slow upward movement of the parts or there would be no movement. To overcome this difficulty, a lateral port 40 communicates with a vertical passage 41 disposed on the inner side of the cylinder 23 and the passage 41 is controlled by a spring pressed ball check valve 42 which, as shown on Figure 3 seats upwardly. The vertical passage 41 communicates with the interior of the cylinder 23 by lateral ports 43 and 44, the former being disposed a substantial distance upwardly from the port 40 and the latter being at the upper end of the passage 41. It will be seen that when the piston 28 uncovers the port 40 and the subatmospheric pressure in the cylinder 23 beneath the piston 28 is sufficiently great, the valve 42 is unseated and the partial vacuum is reduced by taking in or drawing air from above the piston 28. This enables the piston 28 to move upwardly within its cylinder and still maintain the desired suction for holding the folded box to the pad 16. It will be observed that the air which is taken for reducing the partial vacuum beneath the piston 28 is from within the cylinder 23 and not from the outside. The two ports 43 and 44 enable a greater volume of air to pass to the underside of the piston 28 during the movement of the latter up to the port 43, but when the latter is covered by the piston, the passage of air to the underside is restricted, thereby retarding the piston movement. The final movement of the piston 28 after it has passed the port 44 will be cushioned by the air compressed between the upper end of the piston 28 and the end closure 24.

As the pad 16 moves upwardly, a pair of helical coil springs 39 are placed under tension (Figures 2 and 4), the upper ends of these springs being secured to the underside of the hub of the pad 16 and the lower ends being attached to the valve housing 31. Thus after the pad 16 has completed its upward movement, the springs 39 will have been placed under tension so that when the air from the timer valve through the tube 36 is shut off allowing the valve 33 to move to the right, thus connecting the port 34 with the exhaust port 35, the springs 39 will return the parts abruptly to the lower position, disposing the pad 16 in position beneath the turntable 15 for engaging and lifting the next succeeding folded box after the next indexing movement of the turntable has been completed.

It is desired that this downward movement of the pad 16 and associated parts be abrupt until the piston 28 approaches the lower portion of its movement, when its motion is gradually retarded. For this purpose and as shown in Figure 3, a vertical passage 45 is disposed at the outer side of the cylinder 23 and in the upper end portion of this passage is a downwardly seating ball check valve 46 which seats by gravity. The passage 45 communicates with the interior of the cylinder 23 above the ball valve 46 through a lateral port 47. The lower end of the passage 45 communicates with the cylinder 23 by three lateral ports 48, 49 and 50, which are progressively smaller in diameter, the port 48, the uppermost port, being the largest. It will be further noted that the uppermost lateral port 47 is larger than any of the ports 48, 49 and 50. When the piston 28 moves upwardly, the ball valve 46 remains in its seat, since the pressure holding the valve 46 to its seat is greater than that which would tend to unseat it. However, when the piston 28 moves downwardly, the upward pressure created in the vertical passage 45 is sufficient to unseat the valve allowing air from below the piston to pass upwardly through the lateral ports 48, 49 and 50, past the valve 46 to the upper portion of the cylinder 23 through the lateral port 47. When the port 48 is covered by the piston 28, the downward movement of the latter is checked since the area of the ports 49 and 50 restricts the passage of air from the cylinder 23. This downward movement of the piston 28 is further checked as the ports 49 and 50 are progressively covered so that when the piston 28 passes the lowermost lateral port 50, it moves relatively slowly and the air beneath the piston acts as a cushion to bring it to a stop.

When the pad 16 delivers a folded box to the welding mechanism, it is important that the side and end walls be properly positioned relative to each other and mechanism is provided (Figures 2 and 6) to insure that this will be accomplished. For this purpose, an arm 51 is arranged on each side of the path of travel of the folded box as the latter is moved above the turntable 15. Each arm 51 has a bent outer end portion or pan 52 so that in the downward position of the arms, the pans are in a horizontal plane, as shown on Figure 2. On the underside of each pan 52 is a pair of cam plates 53 which, as shown on Figure 11, incline in opposite directions and depend below the arm in the normal horizontal position thereof. Each arm 51 is mounted on a pivot pin 54 which is fixed for movement with the arm, the pivot pins being rotatable in stationary brackets 55. Encircling each pivot pin 54 is a portional spring 56 which urges the respective arm to its normal or downward position shown on Figure 2. On the end of each pivot pin 54 is a fixed arm 57 to which a vertically disposed piston rod 58 is pivoted, the latter having a piston 59 which reciprocates in a fixed cylinder to which air under pressure from the timing valve mechanism is delivered through a tube 60.

As the pad 16 raises a folded box, air under pressure is simultaneously delivered to the tubes 60 for swinging the arms 51 upwardly so that as the box travels upwardly, the cam plates 53 engage the side walls 12 adjacent each end of the box and insure that they are properly positioned, whereas the portions of the pans 52 between the cam plates 53 engage the opposite end walls 11 of the box to make sure that they are properly positioned relative to the side walls.

The brackets 55 depend from horizontally disposed L-shaped supporting bars 61 (Figure 8) which are suitably secured in a stationary manner to the supporting post or column of the turntable. To further insure that the side and end walls of the box are properly positioned relative to each other when the box is delivered to the welding mechanism, a pair of oppositely inclined guide plates 62 depend from the supporting bars 74 respectively and are arranged directly above the position assumed by the pans 52 when the latter are in their raised positions (Figure 7).

Welding electrodes are directly above the inclined guide plates 62 and consist of sets of movable electrodes 63 and stationary electrodes 64, a pair of these electrodes being arranged for each corner of the box for the purpose of welding or homogeneously uniting the tabs 14 of the end walls 11 to the adjacent portions of the side walls 12. Normally, these sets of electrodes are spaced apart so that the vertically movable pad 16 will move the folded box so that the stationary electrodes 64 are arranged inside of the box and the movable electrodes 63 are disposed on the outside of the box.

Each movable electrode 63 is embraced on three sides by an insulating block 65 which is U-shaped in cross section. Each insulating block 65 is carried by a bell crank arm 66 which is mounted on a stationary pivot 67. On the outer side of each insulating block 65 is a separate insulating plate 68 which is doweled to be free from the block 65 and is held in place by a leaf spring 69 which has one end fixed to the arm 66. The outer end of each insulating plate 68 is L-shaped and resiliently engages the outer face of the adjacent end wall 11 of the box near the folded tab, and as will hereinafter appear, urges the end wall against the stationary electrode 64, before it is welded.

Pneumatic means is provided to actuate the individual movable electrodes 63 into engagement with the side walls of the box in the region where the latter engages the folded tab 14. For this purpose, a piston 70 is adapted to engage the arm 66 and is reciprocable within a cylinder 71 which is stationary and is carried by a supporting plate 74. A coil spring 72 is interposed between the stationary part and each arm 66 for urging the latter to inoperative position (see Figure 10). Air from the timer valve mechanism is introduced to each of the cylinders 71 through individual tubes 73. The supporting plates 74 extend beneath the horizontal supporting bars 61 and are adjustably secured in place. As shown, elongated slots 75 in the bars 61 are provided for the plate 74 respectively and knurled headed screws 76 adjustably secure the respective plate 74 in the desired position. This enables the individual supporting plates 74 to be adjusted to accommodate different sized boxes.

Associated with each of the four movable electrodes 63 and arranged to engage the inside of the box are four stationary electrodes 64, each of which is adapted directly to abut against the inside of a tab 14. From Figure 8, it will be apparent that the movable electrodes 63 swing through an arc into welding position, the projecting portion of the respective insulating plate 68 pressing against the end wall adjacent thereto to urge it into engagement with the adjacent stationary electrode. The four stationary electrodes 64 are suitably carried by a substantially H-shaped yoke 77 (Figure 47) which is rigidly carried by a supporting arm 78 extending inwardly for attachment to a stationary part of the machine, such as the supporting post or column of the turntable.

The electronic equipment and associated parts for effecting the welding of the tabs 14 to the end walls 12 will be hereinafter described. Suffice it to say that one end of the box is welded and thereafter, the other end is welded. Thus the welding takes place in sequence, one end first being welded and thereafter the opposite end.

After the box has been welded, it is pushed downwardly or ejected from the welding electrodes until it comes to rest on the pans 52 of the pivotally mounted arms 51. Such ejection is accomplished by a pad 79 which may be of wood, and is somewhat smaller than the bottom wall of the box, as shown on Figure 6. The ejector pad 79 is carried by a pair of vertically disposed parallel rods 80 which are slidable through apertures in the electrode supporting yoke 77 and also through a guide block 81 which is rigid with a vertically disposed cylinder 82. The cylinder 82 is supported at its lower end by the enlarged end portion of the supporting arm 78 to which it is secured in any suitable manner. Projecting into the upper end of the cylinder 82 is a piston rod 83 having a piston at its lower end (not shown) vertically slidable within the cylinder. The upper end of the piston rod 83 as well as the upper ends of the parallel rods 80 are secured to a cross bar 84. Air under pressure from the timer valve mechanism later to be described, is introduced to the lower end of the cylinder 82 through a tube 85, the air pressure normally holding the parts in raised or inoperative position in which the ejector pad 79 is in the raised position shown in Figure 7. The air pressure is on at all times to hold the ejector pad 79 in the raised position. However, when such air pressure is shut off, then coil springs 86 arranged at opposite sides of the cylinder 82 (only one being shown), abruptly cause the ejector pad 79 to push the welded box downwardly to rest upon the pans 52 of the pivoted arms 51. As shown, the coil springs 86 are connected at their upper ends to the cross bar 84 and at their lower ends to a lower portion of the stationary cylinder 82.

In the operation of the welding mechanism above described, it will be understood that the lifting pad 16 rises to engage a folded box which is held by suction to the pad 16. The pad 16 then delivers the box to the welding electrodes where it occupies the position shown in Figure 8. Just prior to the time that the box reaches the welding electrodes, the two arms 51 are swung upwardly to the position shown in Figure 7 which insures that the end walls and side walls of the box are properly in position to enter the spaces between the welding electrodes, the box being further guided by the oppositely inclined guide plates 62. As soon as the lifting pad 16 has delivered the box to the welding electrodes, the electrodes clamp and hold the box, and the pad 16 promptly retracts. Thereafter, the pans 52 swing downwardly to box-receiving position.

As soon as the welding operation has been performed, the ejector pad 79 is operated in order abruptly to push the box downwardly until it comes to rest upon the pans 52. As soon as the ejector pad 79 has delivered the finished box to the pans 52, it retracts and at that time, a kick-out mechanism operates to push or kick the finished box from the machine.

Referring to Figure 12, a vertically disposed pusher plate 87 is arranged inwardly of the pans 52 and has a spring plate 88 which is connected to a lower rearwardly bent portion of the pusher plate 87 so that the plate 88 normally inclines forwardly and upwardly, in position to engage a side wall of the welded box. The pusher plate 87 is carried at the front end of a horizontally movable piston rod 89 which has a piston 90 at its inner end mounted for reciprocatory movement within a cylinder 91. The cylinder 91 is carried by a supporting arm 92 which is fixed to a stationary part of the machine such, for example, as the tubular column or support for the turntable. Air from the timer valve mechanism is admitted through a tube 93 to the inner end of the cylinder 91 for forcing the piston 90 outwardly, a coil spring 94 being connected at one end to the upper end of the pusher plate 87 and at the opposite end to the supporting arm 92 for forcing the parts inwardly.

It will be understood that as soon as the ejector pad 79 has retracted, air is admitted through the tube 93 to force the piston 90 outwardly or the right of Figure 12, thereby to enable the inclined spring 88 to engage the adjacent side wall of the finished box and force the same abruptly from the pans 52 into a drum or suitable receptacle R. As soon as the finished box has been kicked off, the air is released from the tube 93 enabling the spring 94 abruptly to retract the piston and associated parts.

Referring to Figure 8, a post 95 is adjustably slidable through the supporting arm 78 and its vertical position can be fixed by a set screw 96. Carried by the post 95 for up and down movement with it, is a switch 97 which has a laterally extending switch actuating arm 98. As indicated on Figure 13, when a box has been delivered to welding position by the pad 16, it engages the switch arm 98 and rocks it sufficiently to close the switch. In this connection it will be noted that the switch arm 98 is pivotally mounted at 99 and carries a cam 100 which bears against a contact carrying spring arm 101. Thus when the box is moved to welding position and trips the switch arm 98, the latter moves the contact carried by the arm 101 into engagement with a stationary contact 102. Extending from the stationary contact 102 is a lead 103 which passes through a side wall of a housing 104 and connects to a conducting plate 105. The conducting plate 105 is attached to the upper side of a horizontally disposed reciprocatory insulating plate 106 arranged within the housing 104. As shown on Figure 13, at the right hand end of the plate 106, is a socket 109 which slidably receives a cylindrical pin 108 rigidly carried by the housing 104. Interposed between the end of the pin 108 and the bottom of the socket 107 is a coil spring 109. At the left hand end of the plate 106 is a socket 110 into which projects a rigid tube 111 rigidly carried by a wall of the housing 104. The arrangement is such that air under pressure delivered to the tube 111 is sufficient to shift the plate 106 to the right of the figure, compressing the spring 109. When the air pressure is released, then the spring 109 returns the plate 106 to its left hand position.

Depending from the conducting plate 105 is a pair of spaced parallel pins 112 which extend through the plate 106 and carry at their lower ends contact knobs 113 and 114 respectively. Carried by the bottom wall of the housing 104 is a rigid upstanding contact plate 115 which is disposed between the contact knobs 113 and 114 and when the reciprocatory plate 106 is in its right hand position, the knob 113 engages the plate 115 and when in the left hand position, the knob 114 engages the contact plate 115. Extending from the rigid contact plate 115 is a lead 116 which connects to a relay 117 which in turn is connected to a source of electrical current 118. Extending from the relay 117 is a lead 119 to an electronic machine 120, the details of construction and operation of which form no part of the present invention so that description thereof is not considered necessary. Suffice it to say that the electronic machine creates high frequency electrical impulses for effecting the desired welding through the stationary and movable electrodes heretofore described.

Returning now to the switch 97 which has the box operated arm 98, a lead 121 extends from the movable contact 101 to a stationary contact carrying spring arm 122 with which the contacts of a movable contact carrying arm 123 is engaged. A lead 124 extends from the contact of the movable contact arm 123 to a contact carried by a stationary contact carrying arm 125. Normally the contact of the arm 125 is spaced from the contact carried by a movable contact carrying arm 126. From the latter extends a lead to ground 127.

The movable contact carrying arm 126 has a pivoted arm 128, the arm 128 being connected at its opposite end to a piston 129 which is reciprocable within a cylinder 130. Connected to an intermediate portion of the movable contact carrying arm 123 is an arm 131 which is connected at its opposite end to a piston 132 reciprocably mounted within a cylinder 133. Disposed at right angles to cylinders 130 and 133 is a plunger cylinder 134 in which a plunger 135 is reciprocable. Midway between the cylinders 130 and 133 and leading from the cylinder 134 is a passage 136 with which a tube 137 communicates, the latter being connected at its opposite end to the rigid tube 111 within the housing 104.

After the timing valve mechanism as will hereinafter appear, has operated, air under pressure is introduced through a tube 138 to the outer end of the cylinder 134, thereby forcing the plunger 135 downwardly (Figure 13) and first uncovering the port to the cylinder 130, and thus admitting air to drive the piston 129 to the left of the figure for bringing the contacts carried by the arms 126 and 125 into engagement. In so doing, the circuit is completed from the ground 127 through the leads 124 and 121, the switch 97, the lead 103, the conducting plate 105, one of the depending rods 112, and the contact knob 114, the stationary contactor 115 and thence through the lead 116 to the relay 117 and source of electrical current 118. The relay then energizes through the lead 119 and sets in operation the oscillator circuit of the electronic machine 120.

It will be understood that the plate or bar 106 is normally in its left hand position due to the action of the spring 109, so that the contact knob 114 is in engagement with the contactor 115. Manifestly movement of the bar 106 to the right of the figure in response to air under pressure from the tube 111 will bring the contact knob 113 into engagement with the contactor 115. The circuit will be broken during the movement of the bar 106 when the contactor 115 is freed of engagement with one of the knobs 113 and 114.

As the plunger 135 continues its downward movement, it uncovers the passage 136 and allows air to pass through the tube 137 to the rigid tube 111 for shifting the bar 106 to the right of the figure and the bar 106 will be held in this right-hand position until the passage 136 is covered upon the return or upward movement of the plunger 135. The further movement of the plunger 135 uncovers the port leading to the cylinder 133 whereupon the piston 132 is forced to the left and moving the contact carrying arm 123 away from the arm 122 and thereby breaking the circuit. Afterwards, the air from the timing valve mechanism is shut off allowing the plunger 135 to return or move upwardly. The shutting off of the air and simultaneous opening of the tube 138 to exhaust, as will hereinafter appear, enables the bar 106 to shift to the left of the figure in response to the spring pressure and the contact carrying arm 126 moves away from the arm 125 so that the circuit is broken, it being understood that as soon as the air pressure is shut off, the contact arm 123 moves to bring its contact into engagement with that carried by the arm 122.

When the plunger 135 moves downwardly (Figure 13), its movement should be relatively slow and predetermined so that the same amount of time is taken to effect the welding at one end of the box as is taken to effect the welding at the opposite end of the box, and also to afford the time necessary to perform satisfactory welding operations. On the other hand, after the welding of the box has been accomplished, it is desirable for the plunger 135 to return abruptly to its upper position. As shown, a collar 139 is on the lower end of the plunger 135 and limits the upward movement thereof. Rigid with the collar is a depending reduced extension 140 which is connected at its lower end to a piston 151 which reciprocates within a liquid containing cylinder 142. A helical coil spring 143 is disposed between the bottom end of the cylinder 142 and the piston 141 and functions to return the piston and the plunger 135 to its raised position. A post 144 in the lower end of the cylinders limits the downward movement of the piston. Formed in the piston is a longitudinal passage 145 and disposed therein is a ball valve 146 which seats when the piston moves downwardly, but is unseated when the piston 141 moves upwardly within its cylinder. Formed in the lower end of the plunger extension 140 is a T-shaped passage 147 which communicates with the piston passage 145 to permit flow of liquid upon the upward movement of the piston. At one side of the cylinder 142 and parallel thereto is a longitudinal passage 148 which communicates at one end with an enlarged chamber 149 above the cylinder 142 and at the other end with the lower end portion of the cylinder 142 through a lateral port. The lateral port is controlled by a manual needle valve 150 thereby to regulate the downward movement of the piston 141 in its cylinder.

It will be understood that when the plunger 135 moves downwardly, the ball valve 146 is seated and the liquid within the cylinder 142 is forced past the valve 150 and up through the passage 148 to the chamber 149 and this movement can be relatively slow or fast as determined by the adjustment of the needle valve 150. When the air pressure in the tube 138 is shut off, then the spring 143 can abruptly move the plunger 135 and associated parts upwardly, the ball valve 146 being unseated and liquid being adapted to pass freely from the upper side of the piston to the lower side thereof as will be readily apparent.

Depending from the electronic machine 120 is a current carrying post 151 which is slidingly engaged by a spring contact arm 152, the opposite end of which is secured to the bar 106 by a pin 153 of electrical conductive material to the lower end of which is secured a contact plate 154 disposed on the underside of the bar 106. Suitably mounted beneath the bar 106 and in the path of movement of the contact plate 154 are contact rollers 155 and 156 which are spaced laterally from each other. The contact roller 155 is electrically connected by a lead 157 to a pair of stationary electrodes 64 arranged at one end of the box for welding the corner portions thereof. The movable electrodes 63 are connected to ground by leads 158 and 159 respectively. Thus when the bar 106 is in its left-hand position (Figure 13), the high frequency current from the electronic machine passes through the post 151, the contact arm 152, pin 153, contact plate 154, roller 155 and through the lead 157 to the stationary electrodes 64. When the bar 106 is in its right-hand position to bring the contact plate 154 into engagement with the roller 156, current passes from the roller 156 through a lead 160 to the stationary electrodes 64 at the opposite end of the box. The movable electrodes 63 at the opposite end are connected to ground by leads 161 and 162, respectively. Between the stationary and movable electrodes, high frequency oscillations are set up due to the action of the electronic machine. Thus it will be apparent that first one end of the box is welded so that the tabs on that end are simultaneously welded to the adjacent side walls and after that operation has been performed, then the tabs on the other end of the box are welded to the adjacent side walls. The same period of time is devoted to the welding of the tabs on one end of the box as upon the opposite end of the box, and consequently a uniformly welded box structure is obtained.

Heavy brass or copper rod loops 163 (Figures 7 and 9) serve as tuners for oscillation control, the slider 164 serving as an adjustment for correcting the tuning. The design gives flexibility to the tuner 163 to permit the necessary movement of the electrodes 63.

A timer valve mechanism controls the delivery of air under pressure to the various parts of the machine as heretofore described. Since mechanisms for performing this function are conventional and available commercially the particular timer valve mechanism will not be described in detail. A specific form of timer valve is disclosed in the forementioned copending application. That disclosure is incorporated herein by reference to the extent necessary for a full understanding of this invention.

In order to synchronize the operation of the various parts of the machine, the compressed air must be delivered to the right place at the right time. The valves which control the admission and exhaustion of compressed air are cam-actuated, the various cams being positively driven and coordinated to the movement of the turntable.

The positions and angularity of the several cams are predetermined and selected to effect compressed air delivery and exhaust at the proper time. Compressed air is delivered to the timing mechanism from any suitable source such as from a pressure tank to which air is delivered by a suitable compressor.

The above described machine enables large quantity production of boxes of plastic material to be effected in an exceedingly rapid and efficient manner, greatly decreasing the cost of production and making possible the economical manufacture of plastic boxes of uniform size, shape and with uniformly welded walls.

It is to be understood that numerous changes may be effected in details of construction, arrangement, operation and choice of materials without departing from the spirit of the invention, especially as defined in the appended claims.

What I claim is:

1. Welding mechanism for welding a plastic box blank into a finished box having a bottom wall, side and end walls, and tabs on the walls for welded attachment to a contiguous portion of the adjacent wall, comprising sets of stationary and movable electrodes arranged in pairs with one pair at each corner of the box being formed with the electrodes of each pair mounted for movement to and from an open position where the movable electrode is spaced from the stationary electrode and a closed position where the movable electrode is brought toward the stationary electrode for exerting clamping pressure upon box portions between said pair of electrodes, means for actuating the movable electrodes toward and away from the stationary electrodes, means for moving individual box blanks into welding position when the electrodes are in open position and with an adjacent flap and wall portions of the box between each pair of electrodes, guide means engaging the side and end walls of the box as it is moved toward the electrodes and before reaching the electrodes to insure proper positioning of said flap and wall portion relative to each other and between the pairs of electrodes, means for generating welding heat between said electrodes when they are moved to closed position, and means to eject the box from the electrodes after welding and the electrodes are moved to open position.

2. Welding mechanism as claimed in claim 1 comprising pivoted arm means for each movable electrode, fluid pressure means for actuating said arm means to operative position to position the respective movable electrode against a portion of the side wall of the box in opposition to the respective stationary electrode, a spring-tensioned element associated with each arm means for abutting against the adjacent end wall of the box for urging same snugly against the respective stationary electrode, and spring means for rocking said arm means to inoperative position.

3. Welding mechanism as claimed in claim 1, in which the box delivering means comprises a vertically reciprocatory pad engageable with a bottom wall of a box, pneumatic means for actuating said pad upwardly to deliver the box to welding position, means automatically operable during the upward movement of the pad for creating a suction in the box-engaging portion thereof to insure the retention of the box in place, and spring means for retracting the pad to its lowered position.

4. Welding mechanism as claimed in claim 3, in which the guide means comprises a pair of pivotally supported pans normally disposed in horizontal position and adapted to receive the box after welding, pivotal mounting for each of said pans, oppositely inclined cam plates on the underside of each pan, fluid pressure means operable in timed relation to the movement of the box-carrying pad for rocking said pans to position said cam plates in the path of travel of the box, the cam plates engaging opposite side walls of the box and the underside of the pan engaging the end walls of the box thereby to insure the proper relative position of the side and end walls, said pans being retained in such elevated position until the pad has retracted.

5. Welding mechanism as claimed in claim 4, comprising stationary guide elements disposed above the pans for cooperating therewith in guiding the relative position of the side and end walls of the box during its upward travel to the electrodes.

6. Welding mechanism as claimed in claim 1, in which the box ejecting means comprises a vertically movable pad, spring means for actuating said pad to eject the welded box from the electrodes, and fluid operated means for returning the pad to its raised inoperative and to hold same in such position.

7. Welding mechanism as claimed in claim 1 comprising a source of high frequency current, means to energize said source, means to direct said current to the electrodes at one end of the box, means for directing said current to the opposite end of said box, and fluid pressure controlled means for successively directing current first to one of said directing means and then to the other of said directing means, and means for insuring that the welding period is the same for each of said directing means.

8. Welding mechanism as claimed in claim 7 comprising means responsive to the positioning of the box to be welded in welding position for energizing through a relay the source of high frequency current.

References Cited in the file of this patent
UNITED STATES PATENTS

| 2,528,492 | Bradley et al. | Nov. 7, 1950 |
| 2,719,901 | Bradley et al. | Oct. 4, 1955 |